United States Patent [19]

Bonfigli

[11] 4,017,984
[45] Apr. 19, 1977

[54] SHOE TYING INSTRUCTIONAL DEVICE
[76] Inventor: Daniel J. Bonfigli, 88 Hacienda Drive, Tiburon, Calif. 94920
[22] Filed: Mar. 22, 1976
[21] Appl. No.: 669,186
[52] U.S. Cl. .................................. 35/8 R; 35/57
[51] Int. Cl.² .................................. G09B 19/00
[58] Field of Search .............. 35/8 R, 29 E, 56, 57

[56] References Cited
UNITED STATES PATENTS

| | | | |
|---|---|---|---|
| 1,853,790 | 4/1932 | Westcott | 35/1 |
| 2,313,874 | 3/1943 | Hume | 35/1 |
| 2,385,197 | 9/1945 | Eisel | 35/1 |
| 2,527,242 | 10/1950 | Clark | 35/56 |
| 2,624,957 | 1/1953 | Collins | 35/1 |
| 2,646,630 | 7/1953 | Miller | 35/1 |
| D143,237 | 12/1945 | Pares | 35/1 X |

Primary Examiner—William H. Grieb
Attorney, Agent, or Firm—Melvin R. Stidham

[57] ABSTRACT

An educational device for teaching one to lace shoes comprising a pair of panel members hingedly secured to a base to simulate the side flaps of a lace-up shoe. Areas along the edges of the flaps around the holes are two colors alternately arranged and each end of the shoestring is colored to match one of the hole designation colors, whereby the shoe is laced by threading the shoestring through openings of like colors. Crossed lines of the same colors are placed on the base member to direct crossing of the lace ends and a spot directs placement of a finger to loop the first half of a bow.

7 Claims, 12 Drawing Figures

SHOE TYING INSTRUCTIONAL DEVICE

BACKGROUND OF THE INVENTION

Lacing and tying a shoe may be a very formidable task for a young child, and teaching a child to perform this task is often time consuming, requiring a considerable amount of patience. Others have devised means for simplifying the lacing of the shoes, as by color coding, but there is lacking an effective device for teaching the complete operation of lacing and tying one's shoes.

OBJECTS OF THE INVENTION

It is an object of this invention to provide an educational device to teach a child to lace and tie his shoes.

It is a further object of this invention to provide a device for educating a child in lacing and tying his shoes and for entertaining him as well.

It is a further object of this invention to provide a useful educational device which serves also as entertaining diversion for a child.

Other objects and advantages of this invention will become apparent from the description to follow when read in conjunction with the accompanying drawings.

SUMMARY OF THE INVENTION

In carrying out this invention, I provide a board or panel to which is adhered the outline of a child's shoe with side flaps hingedly carried therein. A shoe string has its opposite ends dyed in two different color codes an the lace openings in the side flaps are also coded to the same colors. Of course, the colors around the opening alternate as the lace ends switch from side to side. A marking on the lace end on the shoe allows for alignment of the lace at the outset, and color coded arrows and indicators guide the child in tying the shoe after it is laced.

DESCRIPTION OF PREFERRED EMBODIMENTS

Figure 1:
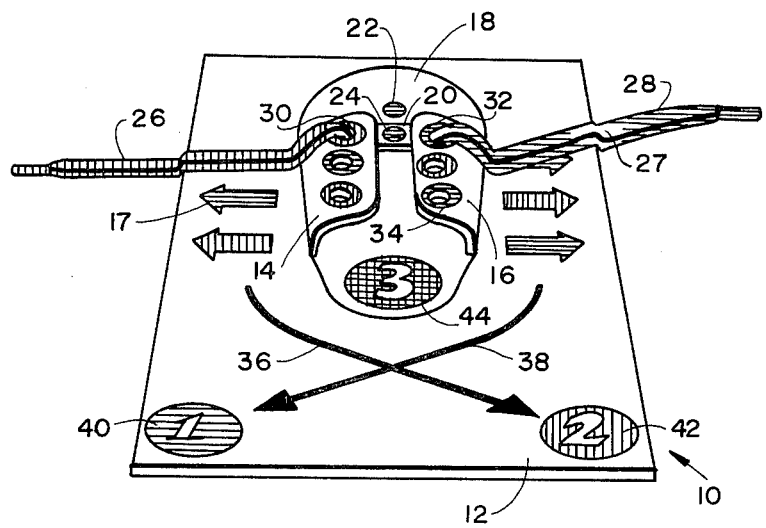
FIG. 1 is a view in perspective of a shoe tying instructional device embodying features of this invention.
Figure 2:
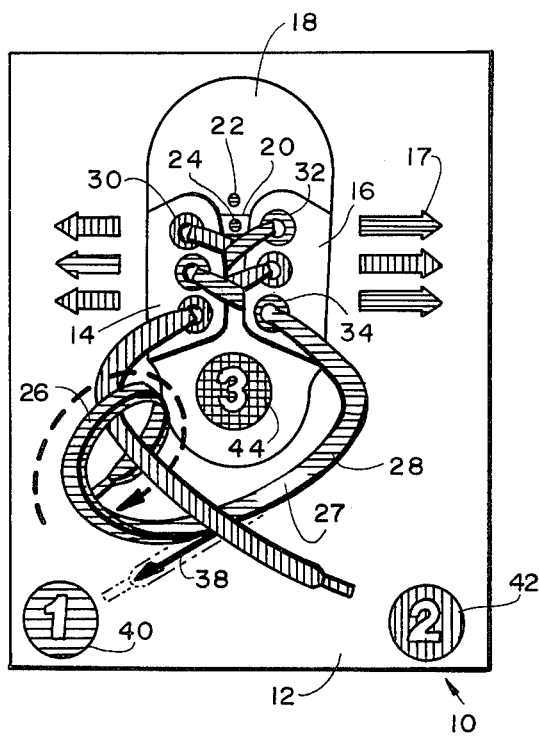
FIG. 2 is a plan view of the device laced but untied.

Referring now to FIGS. 1 to 6 with greater particularity, the educational device 10 of this invention comprises a base member or panel 12 on which are hingedly mounted a pair of panel flaps 14 and 16 which simulate the side flaps of a lace-up shoe. Preferably, the panel 12 is delineated at 18 with the outline of a shoe for visual effect, or the "shoe" may be formed from a sheet from which the side flaps 14 and 16 are made and adhered to the panel 12. A conventional shoestring 20 is provided for use with the side flaps 14 and 16.

On the "instep" of the shoe intermediate the two side flaps 14 and 16 is provided an alignment symbol 22 such as a colored dot, and a complementary symbol 24 is provided at the mid-point of the shoelace whereby, by aligning the dots 22 and 24, the opposite ends 26 and 28 of the shoestring 20 are of substantially equal length to start the lacing.

Figure 8:
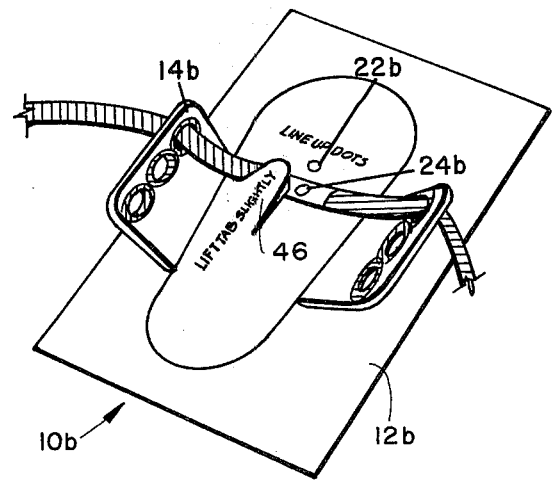

The opposite ends of the lace 26 and 28 are dyed of different colors, such as blue at one end 26 and red at the other end 28. Similar colors 30 and 32 are applied to the side flaps 14 and 16 around the openings 34 through which the laces are inserted, both inside and outside (FIG. 8) whereby the colored lace ends 26, 28 will be inserted through the corresponding colored openings 30, 32. Of course, the hole colors 30 and 32 alternate along the flaps 14 and 16, so that the child will quickly discover that the laces are to be crossed from side to side. In addition, arrows 17 indicate the directions in which the lace ends are to be pulled.

Immediately behind the "shoe" 18 are delineated cross arrows 36 and 38, also blue and red, respectively, with numbers 40 and 42 shown at the ends thereof to indicate sequence of operation. Hence, when the lacing operation is complete, the red lace 28 is disposed along the red line 38 and the blue lace 26 is disposed along the blue line 36, with the red lace being first as indicated by the number "1". Hence, the laces are automatically crossed for initiating the first stage of the bow, which stage is completed merely be bringing the end of the bottom red lace end 28 over and around the overlying lace end 26, and pulling the two ends 26 and 28 to bring them to the position shown in FIG. 3.

Figure 3:
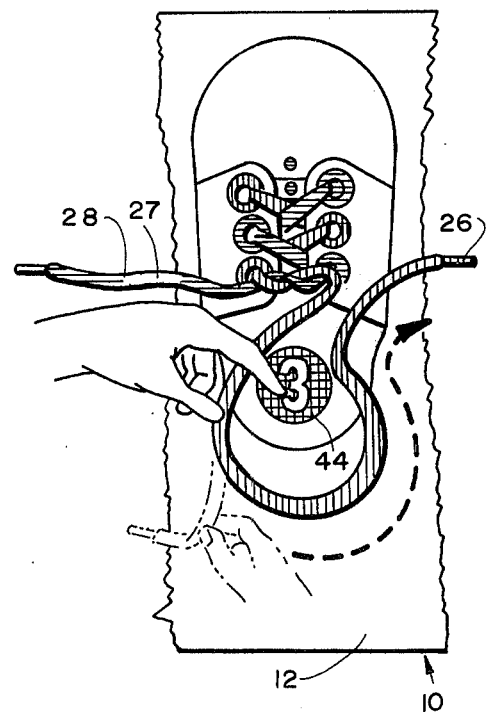
FIG. 3 is a partial plan view of the device partially tied.
Figure 4A:
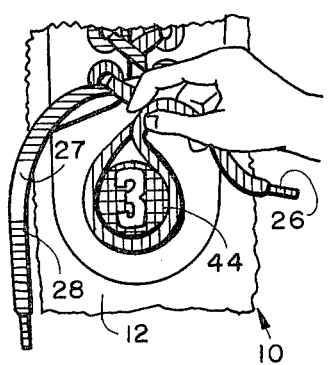
FIGS. 4a, 4b, 5a, 5b, 6a and 6b are views in perspective of the shoe tying process.
Figure 6A:
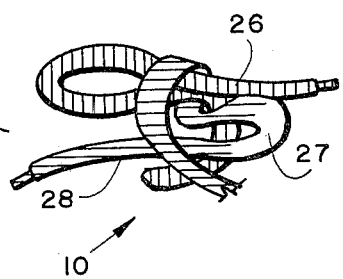
Figure 4B:
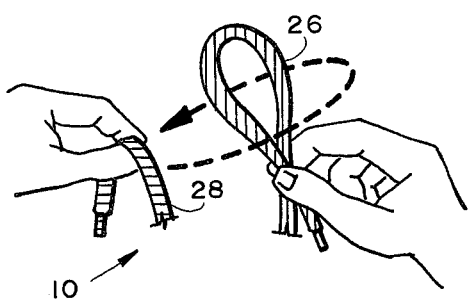

Indicated rearward of the hinged flaps 14 and 16 is the numeral "3" to indicate the third stage of operation which is accomplished by placing the finger on the number and looping one lace around it to form one loop of a bow (FIG. 3).

Figure 5A:
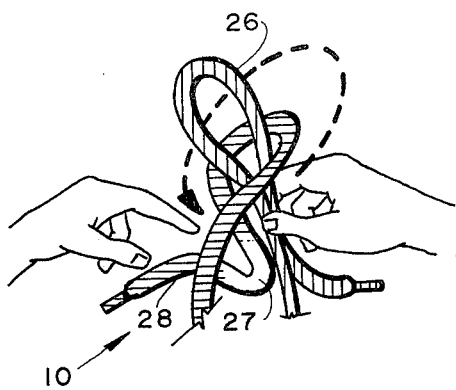
Figures 5B, 6B:
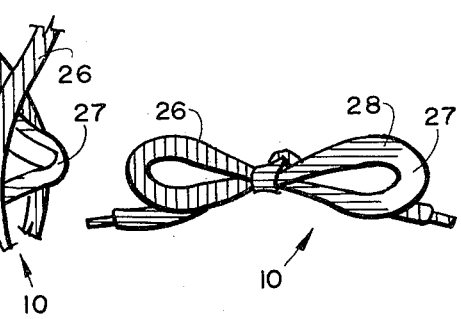

With the foregoing stages of the lacing and tying operation completed, automatically by following the sequences which are color and number coded on the device 10 the child is taught to complete the operation simply by wrapping the second lace end 28 (FIGS. 4b and 5a) around the loop formed by the first 26 (FIG. 4a) and then pushing at a delineated area 27 (FIGS. 5a, 5b and 6a) along the length of the second lace end 28 through the loop just formed and pulling the bow tight to the configuration shown in FIG. 6b.

Figure 7:
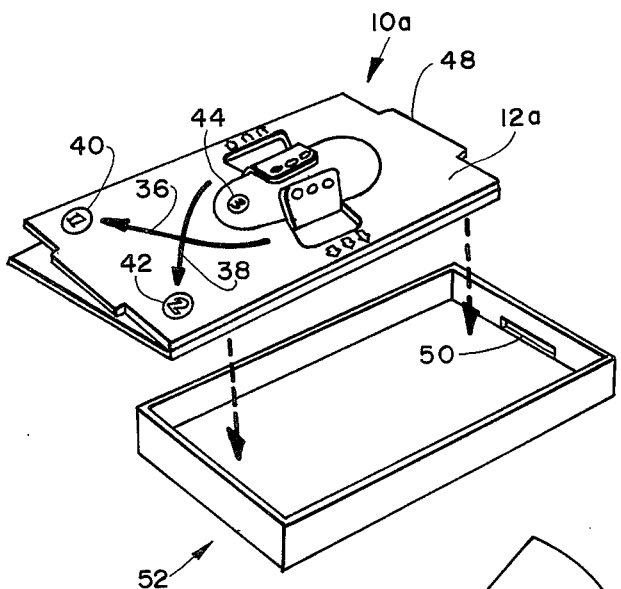
FIGS. 7, 8 and 9 are views in perspective of a specific embodiments of the invention.

As shown in FIG. 7, the base member 12a may be provided with end tabs 48 for insertion into slots 50 in the bottom of a boxtop 52, as for a shoebox (not shown). Hence, the training device of this invention, may be provided as a sales attraction to the child and his parents seeking to purchase shoes.

As an additional feature of this invention (FIG. 8), the base member 12b of the device 10b may be provided with a small lift tab 46 immediately below one of the side flaps 14b whereby when the dots 22b and 24b on the "instep" and lace respectively, are aligned, the lace will be held in place by inserting it under the tab before the lacing is commenced.

Figure 9:
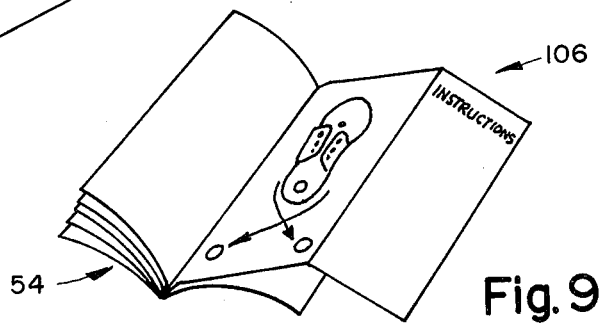

Also if desired (FIG. 9), the device 106 can be incorporated into a child's book 54, possibly including a story about or relating to shoes.

While this invention has been described in conjunction with preferred embodiments thereof, it is obvious that modifications and changes therein may be made by those skilled in the art without departing from the spirit and scope of this invention as defined by the claims appended hereto.

Having described my invention, I claim:

1. An educational device for teaching one to lace and tie shoes comprising:

a base member;

a pair of panel flaps hingedly carried on said base member along generally parallel lines in the nature of the side flaps of a lace-up shoe;

a series of holes along the edge of each of said flaps;

the opposite flaps, in the area around the corresponding holes thereof being of first and second colors, and each flap around holes therein being alternately of said first and second colors;

a shoe lace having the opposite ends thereof in said first and second colors;

paths delineated on said base member in said first and second colors to define the proper disposition of said shoe lace opposite ends for commencing a knot after same has been fully laced;

a point delineated on said base member on which one's finger is to be placed so that one of said lace ends may be looped around said finger for one-half of a bow; and an area delineated on the other of said lace ends displaced from the extremity thereof to indicate placement of one's finger to push said other lace end through a loop formed by wrapping said other lace end around said one-half bow.

2. The educational device defined by claim 1 including corresponding markings on the mid-point of said shoe lace and on said base member intermediate said panel flaps to insure proper alignment thereof.

3. The educational device defined in claim 2 including means releasably securing said lace in said aligned position.

4. The educational device defined by claim 1 wherein:

said panel is adapted to be secured to a cover of a shoe box.

5. The educational device defined by claim 1 wherein:

said panel is formed as a page in an instruction book.

6. An educational device for teaching one to lace and tie shoes comprising:

a base member;

a pair of panel flaps hingedly carried on said base member in the nature of the side flaps of a lace-up shoe;

a series of holes along the edge of each of said flaps;

the opposite flaps, in the area around the corresponding holes thereof being of first and second colors, and each flap around holes therein being alternately of said first and second colors;

a shoe lace having the opposite ends thereof in said first and second colors;

corresponding markings on the mid-point of said shoe lace and on said base member intermediate said panel flaps to insure proper alignment thereof;

a point delineated on said base member on which one's finger is to be placed so that one of said lace ends may be looped around said finger for one-half of a bow; and an area delineated on the other of said lace ends displaced from the extremity thereof to indicate placement of one's finger to push said other lace end through a loop formed by wrapping said other lace end around said one-half bow.

7. An educational device for teaching one to lace and tie shoes comprising:

a base member;

a pair of panel flaps hingedly carried on said base member in the nature of the side flaps of a lace-up shoe;

a series of holes along the edge of each of said flaps;

a point delineated on said base member on which one's finger is to be placed so that one of said lace ends may be looped around said finger for one-half of a bow; and an area delineated on the other of said lace ends displaced from the extremity thereof to indicate placement of one's finger to push said other lace end through a loop formed by wrapping said other lace end around said one-half bow.

* * * * *